United States Patent
Peregrin Emparanza et al.

(10) Patent No.: US 8,787,543 B2
(45) Date of Patent: *Jul. 22, 2014

(54) AMBIENT TELEPHONE COMMUNICATION SYSTEM, A MOVEMENT MEMBER, METHOD, AND COMPUTER READABLE MEDIUM THEREFOR

(75) Inventors: Jorge Peregrin Emparanza, Delft (NL); Aki Sakari Harma, Eindhoven (NL); Pavankumar Murli Dadlani Mahtani, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/264,538

(22) PCT Filed: Apr. 12, 2010

(86) PCT No.: PCT/IB2010/051571
§ 371 (c)(1),
(2), (4) Date: Oct. 14, 2011

(87) PCT Pub. No.: WO2010/119393
PCT Pub. Date: Oct. 21, 2010

(65) Prior Publication Data
US 2012/0033795 A1 Feb. 9, 2012

(30) Foreign Application Priority Data
Apr. 17, 2009 (EP) .................................... 09158115

(51) Int. Cl.
*H04M 3/42* (2006.01)
*H04W 4/00* (2009.01)

(52) U.S. Cl.
USPC ....................................... 379/201.01; 455/461

(58) Field of Classification Search
USPC ......... 379/201.01, 219; 455/461, 414.1, 404.2
See application file for complete search history.

(56) References Cited

U.S. PATENT DOCUMENTS

| | | | | |
|---|---|---|---|---|
| 4,864,607 | A | 9/1989 | Mitamura et al. | |
| 6,442,450 | B1 * | 8/2002 | Inoue et al. | 700/245 |
| 6,490,503 | B1 * | 12/2002 | Hasegawa | 700/245 |
| 6,529,802 | B1 * | 3/2003 | Kawakita et al. | 700/245 |
| 6,577,924 | B1 * | 6/2003 | Kasuga et al. | 700/245 |
| 6,587,751 | B2 * | 7/2003 | Takamura et al. | 700/245 |
| 6,604,021 | B2 * | 8/2003 | Imai et al. | 700/245 |
| 6,615,109 | B1 * | 9/2003 | Matsuoka et al. | 700/245 |
| 6,853,880 | B2 * | 2/2005 | Sakagami et al. | 700/259 |
| 7,031,200 | B2 * | 4/2006 | Kim | 365/189.05 |

(Continued)

FOREIGN PATENT DOCUMENTS

| EP | 1122038 A1 | 8/2001 |
|---|---|---|
| EP | 1289247 A1 | 3/2003 |

OTHER PUBLICATIONS

Harma: "Ambient Telephony: Scenarios and Research Challenges"; 8th Annual Conference of the International Speech Communication Association, Aug. 2007, Antwerp, Belgium, vol. 1, pp. 381-384.

*Primary Examiner* — William Deane, Jr.

(57) ABSTRACT

An ambient telecommunication system includes at least one transmitter and a corresponding receiver for transmitting and receiving an electronically or digitally encoded information signal between two or more conversing parties. The system further includes a movement member configured to perform a movement or assume a certain physical posture, based on the result of content analysis of the information signal.

20 Claims, 6 Drawing Sheets

(56) References Cited

U.S. PATENT DOCUMENTS

| | | | |
|---|---|---|---|
| 7,069,113 B2 * | 6/2006 | Matsuoka et al. | 700/254 |
| 7,813,836 B2 * | 10/2010 | Wang et al. | 700/245 |
| 7,957,837 B2 * | 6/2011 | Ziegler et al. | 700/258 |
| 8,077,963 B2 * | 12/2011 | Wang et al. | 382/153 |
| 8,209,051 B2 * | 6/2012 | Wang et al. | 700/245 |
| 8,234,009 B2 * | 7/2012 | Kitahama | 700/253 |
| 8,376,803 B2 * | 2/2013 | Oonaka | 446/175 |
| 8,472,984 B2 * | 6/2013 | Peregrin Emparanza et al. | 455/461 |
| 8,583,282 B2 * | 11/2013 | Angle et al. | 700/245 |
| 8,594,845 B1 * | 11/2013 | Gharpure | 700/253 |
| 2002/0161480 A1 | 10/2002 | Kakutani et al. | |
| 2003/0118200 A1 * | 6/2003 | Beaucoup et al. | 381/110 |
| 2005/0269580 A1 * | 12/2005 | D'Angelo | 257/88 |
| 2006/0121823 A1 | 6/2006 | Chang | |

\* cited by examiner

AMBIENT TELEPHONE COMMUNICATION SYSTEM, A MOVEMENT MEMBER, METHOD, AND COMPUTER READABLE MEDIUM THEREFOR

FIELD OF THE INVENTION

This invention pertains in general to the field of ambient telecommunication systems, method for operating such system, and a computer readable medium comprising code segments for carrying out the method. More particularly the invention relates to an ambient telecommunication system, comprising at least one telephone unit having a transmitter and a corresponding receiver for transmitting and receiving an electronically or digitally encoded information signal, e.g. comprising speech information, between two or more conversing parties, wherein the telephone unit further comprises a movement member for physically moving in certain ways depending on the content, such as mood, of the speech information.

BACKGROUND OF THE INVENTION

Mediated communication is not supported to its full potential by current communication media. The meaning of a personal relationship cannot be felt, and it is far from a "face to face" feeling.

The meaning of the personal relationship between communicants is especially relevant concerning important contacts and the communication habits and experience between them.

In this respect ambient telephony has been developed. Ambient telephony is an idea of blending communication into a home environment. The system consists of a set of loudspeakers and microphones around the house, which detect when the user moves and renders the call only in the area of the house where the person is, allowing free mobility, providing a 'follow-me' effect to the user. This allows for completely hands-free conversations, without the boundaries of a product or a physical location. It aims to elicit the feeling of a visit instead of just a phone call and to lower the awareness of mediation in the communication.

Several factors are important for the success and optimal experience of ambient telephony. Some examples of these are the sound quality and its spatial distribution, the extent to which the product blends with the home environment, the ease of use and the experience perceived by the users. Within the experience desired of ambient telephony, is social presence.

Current ambient telephony suffers from low feedback of social presence of the remote caller. The freedom of movement that ambient telephony provides makes particularly relevant to provide feedback about the follow-me effect and where the call is being rendered. In order to provide with a rich feeling of being together, it is relevant to provide users with a feeling of the remote caller being there. Ambient telephony of today also suffers from low feedback of the follow-me effect. More precisely, users are not sure whether the call followed them or not. Furthermore, ambient telephony suffers from low representation of the remote caller. While using ambient telephony, the user may miss a certain visual cue of the remote caller and a certain place to look at.

Thus, there is a need for a development within the field of ambient telephony allowing for improved follow-me effect, and an improved representation of the remote caller, including potential mood and/or frame of mind.

Accordingly, the present invention preferably seeks to mitigate, alleviate or eliminate one or more of the above-identified deficiencies in the art and disadvantages singly or in any combination and solves at least the above mentioned problems by providing an ambient telephone communication system, a movement member, a method, and computer-readable medium according to the appended patent claims.

An idea of the present invention is to provide an ambient telephone system user to focus their attention on a target during the call.

An idea of the present invention is to provide an ambient telephone system comprising a movement member configured to move or assuming a certain physical posture depending on the information signal, comprising speech information, sent between at least two conversation parties. The movement or posture is selected such that it resembles certain human behaviors of intimacy and immediacy. In this way the ambient telephone system provides a feeling of social presence (feeling of being together) by rendering a meaningful abstract representation of the remote caller, and the movement member functions as an object at which the user may focus their attention on during the call.

Consequently, an advantage of the present invention is that it makes the user experience richer because intimacy and immediacy cues are rendered resembling a face to face communication. Moreover, it also provides feedback about how the conversation is being performed.

An important feature of the present invention is movement and posture of a phone-let comprising a movement member from a set of one or more phone-lets, where the call is rendered in a certain posture that the user associates with his/her remote caller. Certain properties of movement and posture may further enrich the calling experience by detecting and rendering meaningful properties of the caller and/or conversation via motion patterns. This way the phone-let becomes a meaningful representation of the caller, providing with a feeling that both communicants are in the same room and feedback of movement when the user moves around in the home.

According to an aspect of the invention an ambient telecommunication system is provided. The ambient telephone communication system comprises at least one transmitter and a corresponding receiver for transmitting and receiving an electronically or digitally encoded information signal between two or more conversing parties. Moreover, the ambient telecommunication system comprises at least one movement member being configured to perform a movement or assume a certain physical posture, based on the content of the information signal.

According to another aspect of the invention a method for operating an ambient telecommunication system for transmitting and receiving an information signal between two or more conversing parties is provided. The method comprises selecting a transmitter and a corresponding receiver, among a set of transmitters and corresponding receivers. Furthermore, the method comprises transmitting and receiving an electronically or digitally encoded information signal from the transmitter and the receiver. The method further comprises activating a movement member to assume a certain physical posture based on the result of content analysis of the information signal.

In yet another aspect a computer-readable medium is provided, having embodied thereon a computer program for processing by a computer. The computer program comprises a code segment for selecting a transmitter and a corresponding receiver, among a set of transmitters and corresponding receivers. Moreover the computer program comprises a code segment for transmitting and receiving an electronically or digitally encoded information signal from the transmitter and the receiver. The computer program further comprises a code segment for activating a movement member to assume a certain physical posture based on the content of the information signal.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Figure 1:
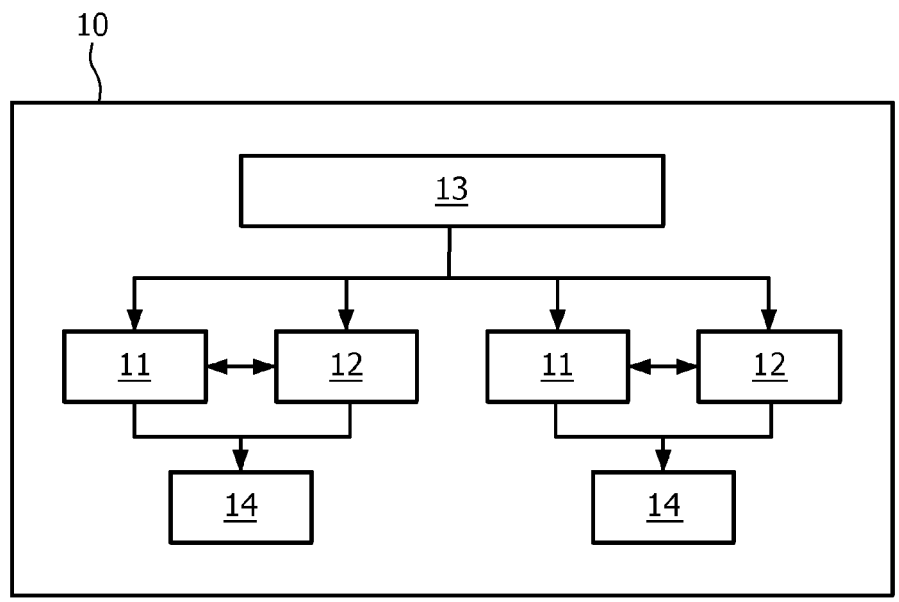
FIG. 1 is a schematic illustration of a system according to an embodiment.

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

An experiment with a basic set up of ambient telephony built into the ceiling of a home-like laboratory, showed a positive trend in ambient telephony towards social presence, in comparison with cordless telephony. There was a significantly better result (p<0.05) for ambient telephony over cordless telephony, regarding the feeling of meeting the other party and how meaningful the experience was. Participants commented very positively on ambient telephony considering it more comfortable and convenient than cordless telephony, especially regarding its hands-free and location-free use. Some participants commented about feeling their contact closer, as if they were in the same room.

In an experiment carried out in Philips' HomeLab, comparing ambient telephony and cordless telephony, participants noticed the sound sources, such as speakers in the ceiling, and in many cases showed intimacy behaviors, such as sending kisses, nodding, staring, etc., towards the sound sources—consciously and unconsciously. On the other hand, there were negative remarks about "talking to the ceiling", "the emptiness", the "unnatural" position of the sound, not having anything to look at. This is annoyance when multi-tasking.

In later experiments, a meaningful color lighted up in the phone system that rendered the call. This showed promising results with significant improvements in social presence and overall better comments of comfort and convenience. Users had explicit comments about the benefit of light in respect of focusing their attention during a call, improved feedback of the follow-me effect, the feeling of presence of the remote caller, and improved representation of the remote caller. The users expressed that the light dragged attention and attracted users to look at it during the conversation and when there is no speech involved. Thus, the feeling of contact between the conversation parties was improved, which also allowed for silent presence. Once the light is there, the conversation parties know that they are being heard and that the other party is there.

The present inventors have thus realized that by providing a visual connection between the conversation parties will improve telephone experience.

In this respect the present inventors extracted and compiled the benefits of the above-identified experiments by providing an ambient telecommunication system 10, for transmitting and receiving an electronically or digitally encoded information signal, e.g. comprising speech information, between two or more conversing parties. The ambient telecommunication system 10 comprises a set of transmitters 11 and a set of receivers 12. This may be realized by integrating a transmitter 11 and a receiver 12 in a transmitting/receiving unit, such as a phone-let, and having the telecommunication system 10 comprising a set of such transmitting/receiving units. The transmitter 11 may for example be a loudspeaker and the receiver 12 may for example be a microphone. The different transmitters 11 and receivers 12 may be located in different confined spaces, such as rooms, so as to allow for sound transmission and/or reception in the different confined spaces. The system 10 comprises a controlling unit 13. The controlling unit 13 comprises an algorithm, controlling the sound transmission and/or reception, such that the transmitter 11 and receiver 12 in a location of strongest sound reception are the ones that are activated. Preferably, the algorithm is such that voices are in prevalence over other forms of sound, such as home equipment. Thus, the system detects when the user moves and renders the call only in the area of for example a house where the user is located. This allows for free mobility, and complete hands-free conversations, without the boundaries of a product or physical location.

Each transmitter 11 and/or receiver 12 may be connected to a corresponding movement member 14, configured to move in certain ways depending on the content of the information signal received and/or transmitted, by the receiver 12 and/or the transmitter 11. In an embodiment, the movement member is integrated in the same unit as the corresponding transmitter 11, such that the movement member 14 may be activated to physically move when the transmitter 11 transmits sound. Thus, the movement member 14 may be integrated in a transmission/reception unit, in accordance with above. The controlling unit 13 is configured to, such as comprising an algorithm for, activating physical movement of the movement member 14 corresponding to the active transmitter 11. In this way, motions may be performed from the same location as sound is received and/or transmitted from. In this way a target to focus attention on during the call is accomplished, while simultaneously improving a follow-me effect, since the user knows what transmitter 11 and/or receiver 12 that is active from the movement of the movement member.

In an embodiment the information signal comprises speech information which originates from the sound of the telephone conversation between the conversing parties. However, the information signal may also comprise an identity of the caller, similar to telephone number presentation, such that the movement member makes assume a posture depending on the identity of the caller.

In another embodiment the information signal comprises video information, for example obtained using a camera located at either side of the communications channel. Hence, when the transmission/reception unit is connected to a camera the controlling unit may process the video information and active the movement member accordingly, to visualize e.g. the facial expression or body language of the user on the remote side. The controlling unit may process the video information using commonly known facial detection techniques or body language identification techniques.

Furthermore, by means of the movement or posture of the movement member 14, the user receives a visual presentation of the mood of the other party and/or the motion of himself/herself during conversation.

In an embodiment the movement of the movement member 14 may be preset by the user. Different postures of the movement member may correspond to the meaning remote callers have for the user, respectively.

For example, the physical posture of a first movement member 14 at a first phone-let that renders the call, would be maintained and transferred to a second movement member 14 connected to second phone-let, as the user moves between the different detection fields of the phone-lets. The physical posture of the movement member also allows the user to recognize the remote caller before the conversation, i.e. if the posture of the movement member 14 is used as a posture-ring tone, during the conversation, i.e. reinforcing the feeling of being there by matching voice and visual, and when there is no speech involved. When multiple callers are communicated to, such as in a telephone conference mode, the different callers may be visualized when talking by different postures.

It is also possible to configure the movement member 14 to convert the mood and/or frame of mind the caller has into movement in a certain way or attaining a certain posture. For example, the caller may indicate on his/her telecommunication system that he/she is happy, sad, or angry, which may be visualized by the movement member 14 by moving into different positions, respectively. Thus, the mood and/or frame of mind of the caller may be visualized to the user receiving the call.

It should be appreciated that the movement member 14 is not limited to be located at the side remote to the caller. Accordingly, any or each side of the communication channel may e.g. be provided with a movement member, which at least visualizes the incoming information signal, e.g. comprising speech information, from the user on the remote side.

Moreover, any user on a remote side may receive a visual representation of the mood and/or frame of mind of the user on the other side by means of the movement member.

Also, the movement or posture of the movement member may correspond to a mood and/or frame of mind of the user on the remote side, during the telephone conversation. Hence all information signals, and thus speech information, sent between the conversation parties may be analyzed by the controlling unit 13, and be translated into movement by the movement member, e.g. located at each of the conversation parties, thereby providing continuous feedback to the conversation parties.

The controlling unit 13 may be located at the transmitting, or the receiving end of the communication channel. When it is in the transmitting end, the control information may be sent from the location of the first user to the location of the second user as side information of the speech data.

In an alternative embodiment the controlling unit 13 is part of a service provided by a communication operator such that the analysis and generation of the control messages is performed in a central server which is a part of the communication infrastructure.

In an embodiment, the controlling unit is configured to process the information signal sent between the parties based on content analysis. The content analysis may e.g. be one of many commonly known Speech Activity Detector algorithms.

In an embodiment the speech activity in the incoming speech signal is analyzed by means of the controlling unit 13.

In an embodiment the controlling unit 13 is configured to change the movement and/or posture of the movement member during the conversation procedure, to envision changes in mood and/or mind set of the other conversation party utilizing the content analysis of the conversation. In particular, commonly known algorithms for automatic detection of emotion in speech may be used. Such content analysis may for example be based on long pauses in the conversation, activity from the other conversation party, the incidence of filler words, such as "huh . . . ", "hm . . . ", "yeah . . . ", or positive words, such as "great", "good", etc.

These mood and/or frame set words may be integrated as indentifying keywords in a predefined list. Thus, it is possible to analyze the boredom, mood, and intimacy of the conversation, and render this with light patterns on the transmission/reception unit, such as a phone-let. This can further indicate if the call is a functional or emotional call. Volume, and changes in volume, such as shouting or whispering, may also be a factor affecting the movement or posture of the movement member to visualize mood or mind set, or changes thereof, of the other conversation party or parties. Other factors affecting the movement or posture to visualize mood or mind set, or changes thereof, of the other conversation party or parties, may be the activity or passivity of the other conversation party or parties, movement of the other conversation party or parties.

In another embodiment the presence of more than one user may be indicated by the movement or posture of the movement member 14. If there is more than one user having different distances to the transmission/reception unit, such as the phone-let, each movement member, e.g. located at each transmission/reception unit, will assume a certain posture according to the relative distance of the phone transmission/reception unit to the user as to the remote user. Thus, if there are two people in the remote location, and one is further away from the transmission/reception unit than the other, then two movement members will assume a different movement or posture, where the farthest phone let will represent the remote user who is farthest from the transmission/reception unit. If both remote people get closer together, then for example only one movement member 14 is gradually and increasingly moved into a posture. For example the relative distance may be calculated utilizing at least one microphone.

By utilizing Speech Activity Detection (SAD) in the controlling unit the movements and postures of the movement member may be controlled such that they represent the current speech activity of the incoming caller. Using SAD information only, the movements can be synchronized by active speech and pauses.

In an embodiment the content analysis comprises an algorithm for estimation of the pitch of speech activity. Pitch is one of the most important prosodic cues which also in the case of a natural talker is often synchronous with the head movements. There are several commonly known pitch estimation techniques available. For example, in an embodiment when the controlling unit detects a rising pitch contour, it may control the movement member to perform a rising movement upwards, and a detected decreasing pitch contour will result in that the movement member performs a descending movement downwards, in a nodding manner.

In an embodiment the controlling unit comprises software for automatic speech recognition (ASR) and natural language interpretation. In this simplest case this may be a limited vocabulary ASR system capable of spotting words contained in a pre-defined rule-base which converts the spotted words into movements, for example, in ways illustrated in FIGS. 4 and 5. In an alternative embodiment the controlling unit comprises software for ASR combined with natural language interpretation which may derive high-level contextual information about the topics being discussed by the users.

Figure 2:
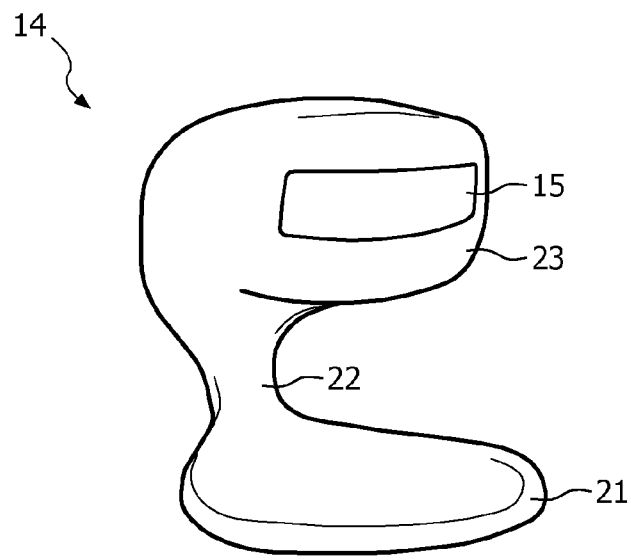
FIG. 2 is an illustration of a movement member according to an embodiment.

FIG. 2 illustrates a movement member 14 according to an embodiment. The movement member comprises a base portion 21, a middle portion 22, and a top portion 23. The base portion, middle portion, and the top portion incorporates a movement stick (not shown) possibly containing at least one joint, such as a ball and socket joint. The movement stick is connected to at least one motor (not shown) for enabling the movement stick to move or assuming a posture. The motor or moving stick may be any suitable known motor or moving stick.

In an embodiment the middle portion 22 is configured as a flexible neck, similarly to that used in commonly known study lamps or goose lamps.

In an embodiment the exterior of the movement member is made of a flexible material.

In an embodiment the movement member may further comprise at least one sensor, such as any known sensor for detecting the relative position of a part of the movement member with regard to the surface at which the movement member is placed or mounted.

Optionally the movement member comprises a light emitting unit 15 as will be explained in more in detail below. The movement member may further be provided with a microphone and/or a speaker (not shown) such that the sound of the user may be transmitted to the other party, as well as the user may hear the sound of the other party, during conversation.

Figure 3A:
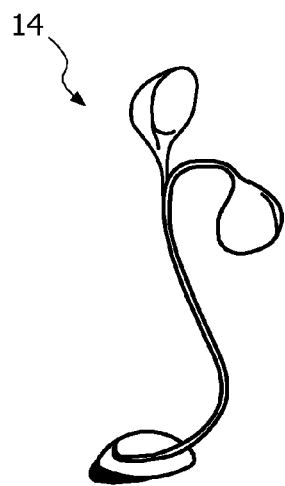
FIGS. 3a to 3b is respectively an illustration of a movement member according to an embodiment.
Figure 3B:
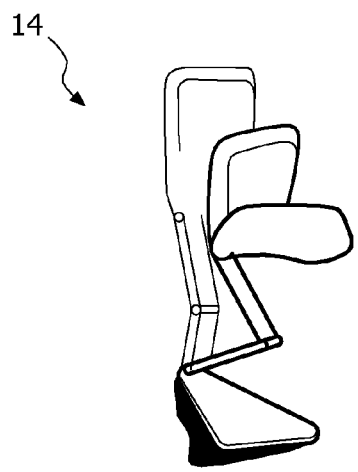

FIGS. 3a to 3b illustrate different designs of the movement member. For example, the movement member may be configured to turn upwards when the conversation turns very active and dynamic with fluent turn taking and fast speech rhythm. Whenever a call's pace is slow, the movement member body may be turned down, with the top portion turning downwards when the call is finished.

Figures 4A, 4B:
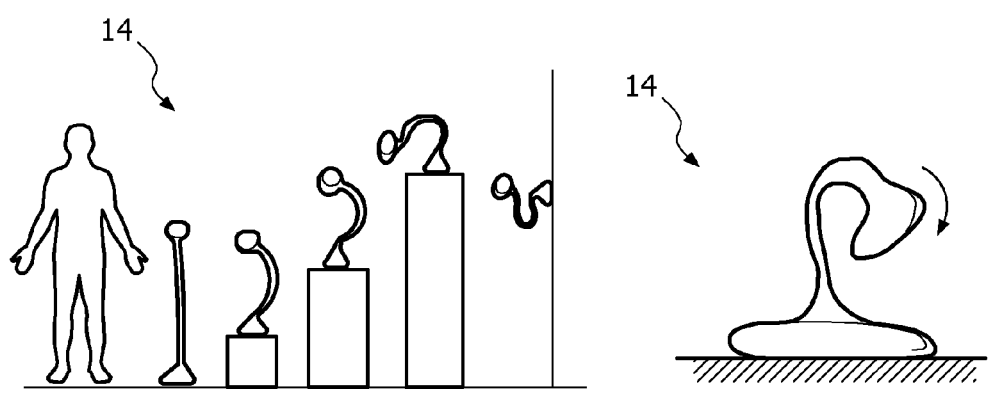
FIGS. 4a to 4l is respectively an illustration of a movement member according to an embodiment.
Figure 4C:
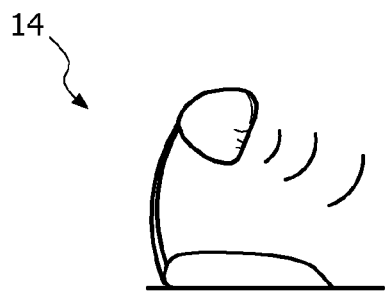
Figure 4D:
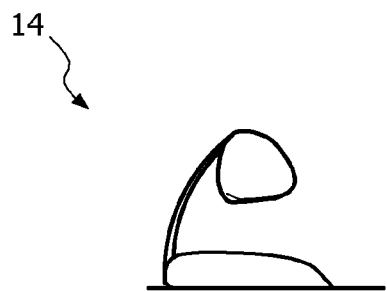
Figure 4E:
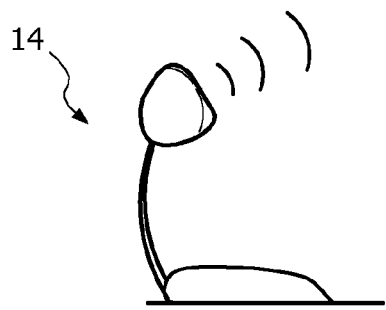
Figure 4F:
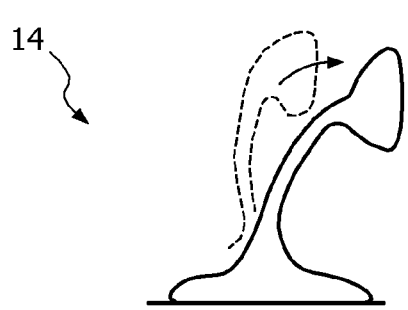
Figure 4G:
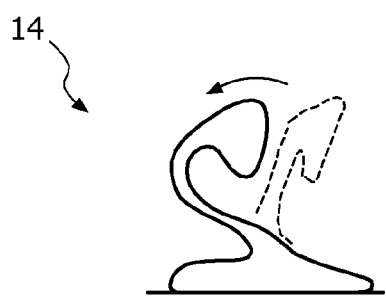
Figure 4H:
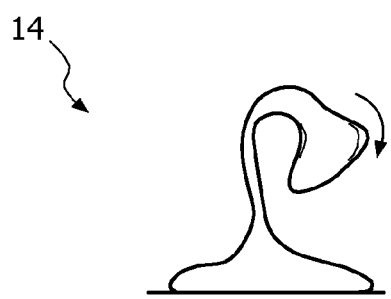
Figure 4I:
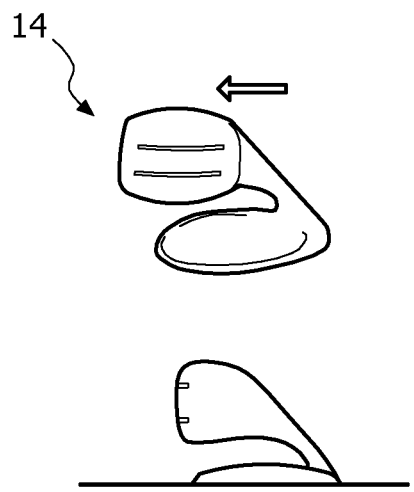
Figure 4J:
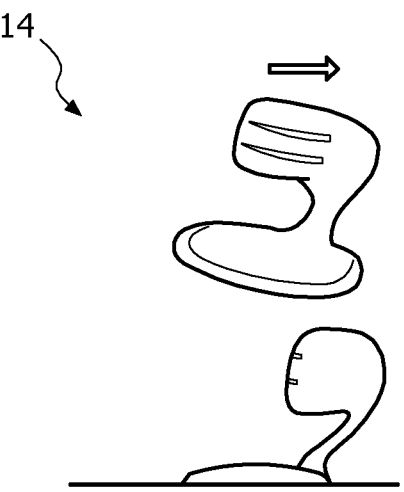
Figure 4K:
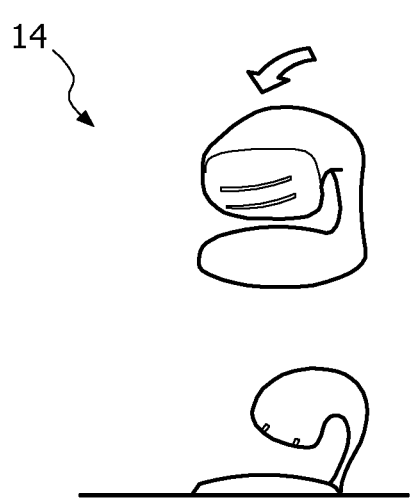
Figure 4L:
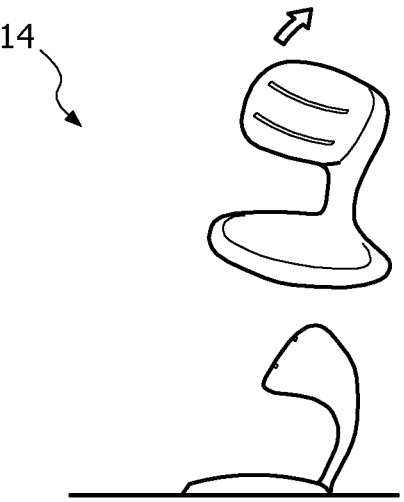

FIGS. 4a and 4b illustrate a translational and rotational movement of the movement member in relation to its base portion. FIG. 4a illustrates a movement member configured such that the top portion of the movement member addresses the user during conversation. This is possible by detecting the direction at which the user is located in relation to the movement member. This may for example be achieved by arranging two or more microphones on the movement member, each registering the volume of speech, whereby the controlling unit correlates the registered volumes and controls the movement member to move towards the direction from which the highest volume was detected. In this way the movement member may follow the user and stare at him/her in a face-to-face communication way, no matter if the device is positioned at different heights or even on the wall.

FIGS. 4c to 4l illustrate different movements and corresponding end postures for different detected moods or frame of minds in the speech information. Furthermore, FIGS. 4c-l illustrate how different movements could refer to human body behavior to render immediacy cues, like leaning forward when the volume is low demanding a higher volume of speech from the user, or leaning backwards with head up to show a very open attitude to talk (like in a very dynamic discussion).

Figure 5A:
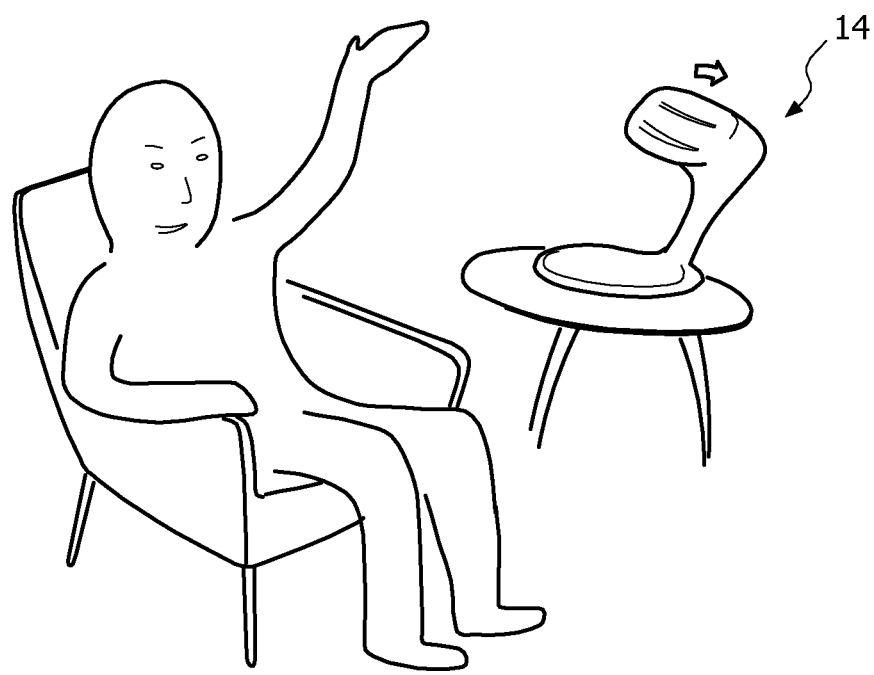
FIGS. 5a to 5b is respectively an illustration of a movement member according to an embodiment.
Figure 5B:
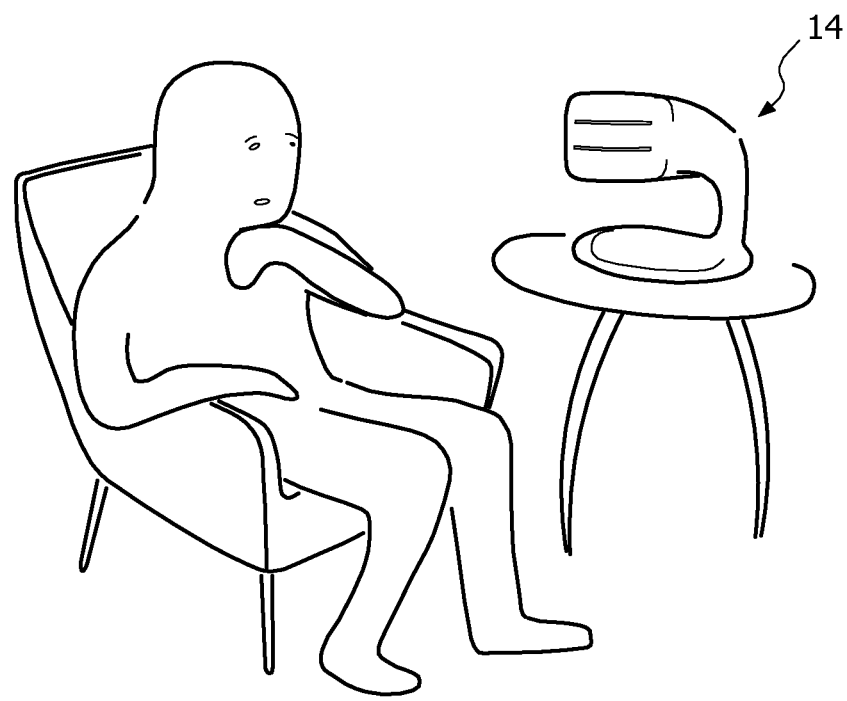

FIGS. 5a and 5b illustrate the movement member 14 according to an embodiment in use. For example, according to the type of conversation, active discussion with loud speech makes the movement member to move upwards and leaning back, while an intimate conversation with low volume speech and slow turn taking makes the movement member device lean forward to show interest.

In an embodiment the base portion of the movement member is configured to be mounted onto a wall or the ceiling of a room.

In an embodiment the base portion of the movement member is configured to be mounted onto an essentially horizontal surface, such as a table.

In an embodiment the base portion of the movement member is configured to be mounted onto any surface.

In an embodiment the movement member 14 is further connected to a corresponding light emitting unit 15. The light emitting unit has a similar function as the movement member, i.e. to visualize to the user that the phone-let is active, or to visualize different colors or intensity depending on the mood or frame of mind of a caller, party, or the user. In some embodiments the light emitting unit 15, has the same capabilities as the movement member, however wherein the movement or posture is instead provided as color and/or intensity. In this way, also sound and color light match, with the sound, such as voice, transmitting the message, and color light acting as meaningful abstract representation of the remote caller. This combination has proved to enrich the user experience.

Preferably, the light emitting unit 15 is provided onto the movement member 14, whereby the user receives both movement or posture information from the movement member 14 and light information from the light emitting unit 15, in use.

Depending on the result of the content analysis of the information signal the controlling unit may control the light properties, such as color and/or intensity, of the light emitted by the light emitting unit.

In an embodiment the light emitting unit 15 is provided as an integral part of the transmission/reception unit.

In one embodiment of the present invention, the transmission/reception unit may be integrated in everyday objects, such as a TV. In this way, if the user happens to be next to or in front of his TV, the TV would switch on and provide not just with light but with meaningful representation of the remote caller via the screen. Other types of transmission/reception units may be selected from the group comprising photo frames, tablets, refrigerators, couches, etc. The telecommunication system described herein may at least be combined or integrated with devices or combination of devices selected from the group comprising ambiPhone, a dedicated device for ambient telephony, ambiPhone in ambilight TV, ambiPhone in photo frame scalable from use of light to use of picture or video, magic mirrors, HiFi systems, etc.

The controlling unit 13 may be any unit normally used for performing the involved tasks, e.g. a hardware, such as a processor with a memory.

Figure 6:
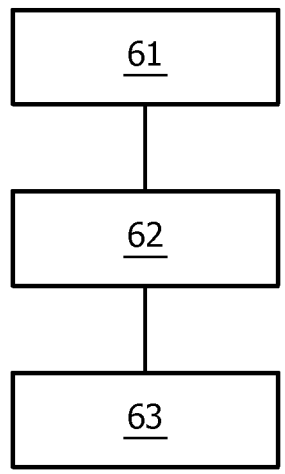
FIG. 6 is a flowchart of a method according to an embodiment.

In an embodiment, according to FIG. 6, a method 60 for operating an ambient telecommunication system 10 for transmitting and receiving an information signal between two or more conversing parties. The method comprises selecting 61 a transmitter 11 and a corresponding receiver 12, among a set of transmitters 11 and corresponding receivers 12. The method further comprises transmitting 62 and receiving an electronically or digitally encoded information signal from the transmitter 11 and the receiver 12. Furthermore, the method comprises activating 63 a movement member 14 to assume a certain physical posture based on the result of content analysis of the information signal.

In an embodiment the step of selecting a transmitter 11 and a corresponding receiver 12, among a set of transmitters 11 and corresponding receivers 12, comprises selecting the transmitter 11 and a corresponding receiver 12 being closest to the user.

In an embodiment the method comprises steps for performing any of the functionalities in the ambient telephone communication system according to some embodiments.

Figure 7:
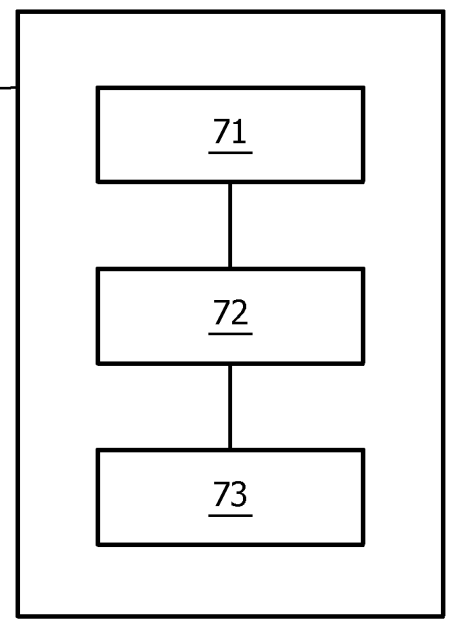
FIG. 7 is a flowchart of a computer program according to an embodiment.

In an embodiment, according to FIG. 7, a computer-readable medium 70 having embodied thereon a computer program for processing by a computer is provided. The computer program comprises a code segment 71 for selecting a transmitter 11 and a corresponding receiver 12, among a set of transmitters 11 and corresponding receivers 12. The computer program further comprises a code segment 72 for transmitting and receiving an electronically or digitally encoded information signal from the transmitter 11 and the receiver 12. Moreover, the computer program comprises a code segment 73 for activating a movement member 14 to assume a certain physical posture based on the content of the information signal.

In an embodiment the computer-readable medium comprises code segments arranged, when run by an apparatus having computer-processing properties, for performing all of the method steps defined in some embodiments.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. An ambient telecommunication system comprising:
a plurality of transmitters; and
a plurality of receivers corresponding to the plurality of transmitters, the plurality of transmitters and the plurality of receivers being configured for transmitting and receiving an electronically or digitally encoded information signal between two or more conversing parties;
at least one movement member being configured to perform a movement or assume a certain physical posture, based on content of the information signal; and
a controlling unit configured to select a transmitter and a corresponding receiver from among the plurality of transmitters and the plurality of receivers for communication with a user,
wherein the selected transmitter and the selected corresponding receiver are closest to the user.

2. The ambient telecommunication system according to claim 1, wherein the controlling unit is further configured to:
perform content analysis on the information signal; and
activate the movement member to perform the movement or assume the certain physical posture based on result of the content analysis.

3. The ambient telecommunication system according to claim 1, wherein the movement member is configured to perform the movement or assume the certain physical posture when a corresponding transmitter or receiver is in an active mode.

4. The ambient telecommunication system according to claim 1, wherein a transmitter, a receiver, and a movement member are integrated in a transmission/reception unit.

5. The ambient telecommunication system according to claim 1, wherein the controlling unit is further configured to activate movement of the movement member corresponding to an active transmitter.

6. The ambient telecommunication system according to claim 1, wherein the movement member comprises a movement stick and a motor for moving the movement stick.

7. The ambient telecommunication system according to claim 1, wherein the transmitter is a loudspeaker and the receiver is a microphone.

8. The ambient telecommunication system according to claim 1, wherein the certain posture of the movement member is preset to correspond to a specific remote caller.

9. The ambient telecommunication system according to claim 2, wherein the information signal comprises speech information, and the content analysis performed on the information signal is configured to detect:
mood and/or frame of mind of by at least one of the user and a remote caller;
an identity of the remote caller;
a distance from a transmitter or a receiver or movement member to the user based upon detection of volume of the speech information;
changes in volume of speech of the at least one of the user and the remote caller;
activity or passivity of the at least one of the user and the remote caller;
physical movement of the at least one of the user and the remote caller;
long pauses in conversation between the at least one of the user and the remote caller;
activity of the at least one of the user and the remote caller;
incidence of filler words in the conversation, or
incidence of positive or negative words in the conversation.

10. The ambient telecommunication system according to claim 1, further comprising a light emitting unit configured to emit light having different colors and/or intensities based on the content of the information signal.

11. The ambient telecommunication system of claim 1, wherein the controlling unit is further configured to:
perform content analysis on the information signal, wherein the content analysis performed on the information signal is configured to detect pauses in a conversation between the user and a caller; and
activate the at least one movement member to perform the movement or assume the certain physical posture based on the detected pauses.

12. The ambient telecommunication system of claim 1, the controlling unit is further configured to detect that the user is near a screen, turn on the screen and display a representation of a remote caller on the screen.

13. A movement member comprising;
a transmitter and a corresponding receiver for transmitting and receiving an electronically or digitally encoded information signal between two or more conversing parties;
a processor configured to perform content analysis of the information signal; and
a light emitting unit configured to emit light having different colors and/or intensities based on the content analysis of the information signal,
wherein the processor is further configured to control the movement member to perform a movement or assuming a posture, based on the content analysis of the information signal.

14. The movement member of claim 13, wherein the processor is further configured to:
detect pauses in a conversation between the two or more conversing parties from the content analysis; and
activate the movement member to perform the movement or assume the posture based on the detected pauses.

15. The movement member of claim 13, the processor is further configured to detect that a user is near a screen, turn on the screen and display a representation of a remote caller on the screen.

16. A method for operating an ambient telecommunication system for transmitting and receiving an information signal between a user and a caller, the method comprising the acts of:
selecting by a processor a transmitter and a corresponding receiver, among a plurality of transmitters and corresponding plurality of receivers;
transmitting and receiving an electronically or digitally encoded information signal from the transmitter and the receiver;
performing content analysis of the information signal; and
activating a movement member to assume a certain physical posture based on the content analysis of the information signal,
wherein the selecting act selects a transmitter and a corresponding receiver that are closest to the user.

17. The method of claim 16, wherein the performing act comprises the act of detecting by the processor pauses in a conversation between the user and the caller, and wherein the activating act activates the movement member to assume the certain physical posture based on the detected pauses.

18. The n method of claim 16, further comprising the acts of:
detecting that the user is near a screen;
turning on the screen; and
displaying a representation of the remote caller on the screen.

19. A non-transitory computer-readable medium having embodied thereon a computer program for processing by a computer, the computer program comprising:
a code segment for selecting a transmitter and a corresponding receiver, among a plurality of transmitters and corresponding plurality of receivers;
a code segment for transmitting and receiving an electronically or digitally encoded information signal from the transmitter and the receiver;
a code segment for performing content analysis of the information signal; and
a code segment for activating a movement member to assume a certain physical posture based on the content of the information signal,
wherein the selecting act selects a transmitter and a corresponding receiver that are closest to a user.

20. The non-transitory computer-readable medium of claim 19, wherein the computer program further comprises:
a code segment for detecting that the user is near a screen;
a code segment for turning on the screen; and
a code segment for displaying a representation of a remote caller on the screen.

* * * * *